(12) United States Patent
Heiby

(10) Patent No.: US 9,503,409 B2
(45) Date of Patent: Nov. 22, 2016

(54) SUPPRESSION OF EXTRANEOUS ALERTS ON MULTIPLE DEVICES

(71) Applicant: Google Inc., Mountain View, CA (US)

(72) Inventor: Ronald Walter Heiby, San Jose, CA (US)

(73) Assignee: Google Inc., Mountain View, CA (US)

( * ) Notice: Subject to any disclaimer, the term of this patent is extended or adjusted under 35 U.S.C. 154(b) by 499 days.

(21) Appl. No.: 13/775,500

(22) Filed: Feb. 25, 2013

(65) Prior Publication Data
US 2014/0244714 A1    Aug. 28, 2014

(51) Int. Cl.
| | | |
|---|---|---|
| *H04L 12/28* | (2006.01) | |
| *H04L 29/08* | (2006.01) | |
| *G06Q 10/10* | (2012.01) | |
| *H04L 12/58* | (2006.01) | |
| *H04W 4/20* | (2009.01) | |

(52) U.S. Cl.
CPC .............. *H04L 51/24* (2013.01); *H04L 67/26* (2013.01); *H04W 4/20* (2013.01)

(58) Field of Classification Search
CPC ............ H04L 29/06027; H04L 41/06; H04L 12/403; H04L 43/10; H04L 29/08; G06F 9/542; G06F 11/2294; G06F 15/16; G06F 10/107; G06F 19/3468; H04M 1/72519; H04W 24/08; A61B 5/14532; G06Q 30/08; G06Q 40/00; G06Q 40/025; G06Q 40/04; G06Q 30/0633; G06Q 40/06; G06Q 10/10
See application file for complete search history.

(56) References Cited

U.S. PATENT DOCUMENTS

| | | | | |
|---|---|---|---|---|
| 5,904,013 A | * | 5/1999 | Greenspan | H04M 3/46 379/211.04 |
| 6,611,204 B2 | * | 8/2003 | Schmurr | 340/538 |
| 7,027,773 B1 | * | 4/2006 | McMillin | 455/41.2 |
| 7,076,243 B2 | | 7/2006 | Parupudi et al. | |
| 7,096,029 B1 | | 8/2006 | Parupudi et al. | |
| 7,221,928 B2 | * | 5/2007 | Laird et al. | 455/404.1 |
| 7,239,693 B2 | * | 7/2007 | Silver | H04M 1/57 379/373.03 |
| 7,243,130 B2 | | 7/2007 | Horvitz et al. | |
| 7,249,159 B1 | | 7/2007 | Horvitz et al. | |
| 7,352,854 B1 | * | 4/2008 | Silver | H04M 3/4288 379/207.16 |
| 7,430,692 B2 | * | 9/2008 | White, III | H04L 41/22 714/39 |
| 7,443,967 B1 | * | 10/2008 | Silver | H04M 3/02 379/106.09 |
| 7,496,630 B2 | | 2/2009 | Arellano et al. | |

(Continued)

FOREIGN PATENT DOCUMENTS

| | | |
|---|---|---|
| EP | 2736200 A1 | 5/2014 |
| GB | 2420880 A | 6/2006 |

(Continued)

*Primary Examiner* — Sargon Nano

(74) *Attorney, Agent, or Firm* — Shumaker & Sieffert, P.A.

(57) ABSTRACT

A system that includes a server and a plurality of destination clients. The server is connected to a network and routes an electronic communication through the network to a destination. The plurality of destination clients are associated with the destination and connected to the network, each destination client comprising: a network interface connected to the network and receiving the electronic communication; an output unit configured to output an alert associated with the electronic communication; and an alert suppression device suppressing output of the alert when a response to the electronic communication has been transmitted from the destination, where the alert suppression device of each of the plurality of destination clients suppresses the alert when any one of the destination clients responds to the electronic communication.

11 Claims, 8 Drawing Sheets

(56) References Cited

U.S. PATENT DOCUMENTS

| | | | |
|---|---|---|---|
| 7,586,956 B1 * | 9/2009 | Mishra | H04L 12/5835 370/522 |
| 7,603,421 B1 | 10/2009 | Roche et al. | |
| 7,975,015 B2 | 7/2011 | Horvitz et al. | |
| 8,234,676 B2 | 7/2012 | Klein et al. | |
| 8,266,233 B1 * | 9/2012 | Roka | H04B 1/00 709/207 |
| 8,352,546 B1 | 1/2013 | Dollard | |
| 8,484,576 B2 * | 7/2013 | Berson et al. | 715/788 |
| 8,548,158 B2 * | 10/2013 | Silver | H04M 1/57 379/373.03 |
| 8,560,632 B2 | 10/2013 | Kamga et al. | |
| 8,570,168 B2 * | 10/2013 | Logan et al. | 340/539.32 |
| 8,619,954 B2 * | 12/2013 | Silver | H04M 3/02 379/106.09 |
| 8,625,409 B2 * | 1/2014 | Kung | H04L 41/0604 370/217 |
| 8,711,732 B2 * | 4/2014 | Johnson | 370/259 |
| 8,738,723 B1 | 5/2014 | Faaborg et al. | |
| 2002/0087649 A1 | 7/2002 | Horvitz | |
| 2003/0115122 A1 * | 6/2003 | Slater | G06Q 10/10 705/35 |
| 2005/0075116 A1 * | 4/2005 | Laird et al. | 455/456.3 |
| 2006/0133590 A1 | 6/2006 | Jiang | |
| 2007/0088553 A1 * | 4/2007 | Johnson | G06F 3/162 704/257 |
| 2007/0121920 A1 * | 5/2007 | Silver | H04M 1/57 379/376.02 |
| 2007/0130323 A1 | 6/2007 | Landsman et al. | |
| 2007/0214228 A1 | 9/2007 | Horvitz et al. | |
| 2007/0291761 A1 | 12/2007 | Kauniskangas et al. | |
| 2008/0075066 A1 | 3/2008 | Baker | |
| 2009/0054040 A1 | 2/2009 | van Wijk et al. | |
| 2009/0276700 A1 | 11/2009 | Anderson et al. | |
| 2009/0307715 A1 | 12/2009 | Santamaria et al. | |
| 2009/0326791 A1 * | 12/2009 | Horvitz et al. | 701/119 |
| 2010/0029250 A1 | 2/2010 | Gupta | |
| 2010/0219937 A1 | 9/2010 | Heikes et al. | |
| 2011/0302247 A1 | 12/2011 | Narayanan et al. | |
| 2012/0002599 A1 * | 1/2012 | Annavajjala et al. | 370/328 |
| 2012/0136942 A1 | 5/2012 | Amidon et al. | |
| 2012/0198372 A1 | 8/2012 | Kuhlke | |
| 2012/0311045 A1 | 12/2012 | Sylvain | |
| 2013/0295886 A1 | 11/2013 | Kissinger et al. | |
| 2013/0339436 A1 | 12/2013 | Gray | |
| 2014/0149538 A1 * | 5/2014 | Deeter | H04L 67/26 709/217 |
| 2014/0149568 A1 * | 5/2014 | Kruempelmann | H04L 43/0817 709/224 |
| 2014/0173026 A1 * | 6/2014 | Buck | H04L 51/24 709/217 |
| 2015/0163188 A1 | 6/2015 | Faaborg et al. | |
| 2015/0365524 A1 * | 12/2015 | Silver | H04M 3/02 455/415 |

FOREIGN PATENT DOCUMENTS

| | | |
|---|---|---|
| WO | 2013085867 A1 | 6/2013 |
| WO | 2014014927 A2 | 1/2014 |

* cited by examiner

SUPPRESSION OF EXTRANEOUS ALERTS ON MULTIPLE DEVICES

BACKGROUND

Electronic devices, such as mobile communications devices, output alerts or notifications to indicate arrival of incoming electronic communications. These alerts may indicate, for example, arrival of an incoming text message or Email, a request to establish a telephone call, a news update from an information service, an advertisement, and the like. Conventional electronic devices typically support at least one of method or technique to output the notification to the user. Examples of such techniques include visual, aural, and tactile (e.g., haptic technology) output. Thus, an alert indicating the arrival of an incoming text message may generate output of an icon to a display, a beep or other sound to a speaker, and/or a vibration though a haptic system of the electronic device.

It is not uncommon for a user to have access to several different devices configured to receive messages and output alerts. For example, a user could have one or more of a mobile phone with advanced computing capabilities (e.g., a "smartphone"), a tablet computer, a laptop computer, a desktop computer, an Internet-enabled television (TV), or any other type of device. In many cases, multiple devices are capable of consuming the message.

When a message is received from a communications system, it is not uncommon for the user to receive a separate alert on each of multiple devices. For example, a user may be at home when a new Email message is received. The user's mobile phone may play a sound and display a message, the user's tablet may play a sound, the user's TV may display a message, the user's laptop may display a dialog box and play a sound, and/or the user's Internet-enabled appliance may display a message, play a sound, and/or flash a light. Presenting multiple alerts that are related to the same message can be redundant. In addition, receiving multiple alerts can be a nuisance to the user, especially when the alert is received after the message has been consumed, which may cause confusion.

Accordingly, there is a need for a system and method for suppressing extraneous alerts on multiple devices.

SUMMARY

One embodiment provides a system that includes a server and a plurality of destination clients. The server is connected to a network and routes an electronic communication through the network to a destination. The plurality of destination clients are associated with the destination and connected to the network, each destination client comprising: a network interface connected to the network and receiving the electronic communication; an output unit configured to output an alert associated with the electronic communication; and an alert suppression device suppressing output of the alert when a response to the electronic communication has been transmitted from the destination, where the alert suppression device of each of the plurality of destination clients suppresses the alert when any one of the destination clients responds to the electronic communication.

Another embodiment provides a method at a client device. The method includes receiving an electronic communication addressed to a destination; determining whether response to the electronic communication has been transmitted from the destination; determining, when response has not been transmitted from the destination, if the response to the electronic communication has been transmitted from an address associated with the destination; and suppressing output of a notification when response to the electronic communication has been transmitted from one of the destination and the address associated with the destination.

Yet another embodiment provides a method at a client device. The method includes receiving a stream of data associated with an electronic communication; identifying an intended recipient of the electronic communication; determining if the intended recipient responded to the electronic communication by monitoring the stream of data associated with the electronic communication and extracting an identifier associated with the intended recipient from the stream of data; outputting a notification of the electronic communication when the intended recipient failed to respond to the electronic communication; and suppressing output of a notification when the intended recipient responded to the electronic communication.

DETAILED DESCRIPTION

Figure 1:
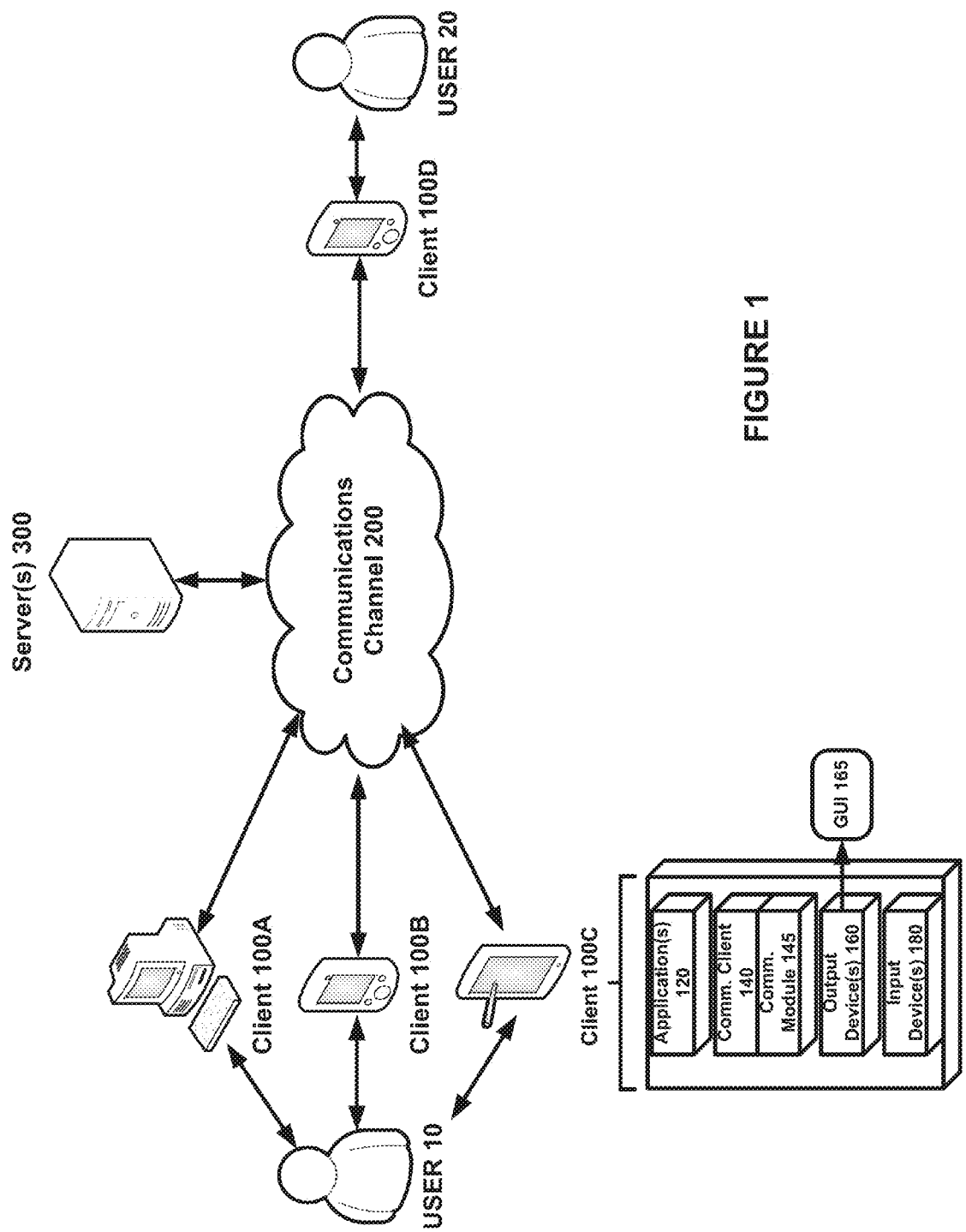
FIG. 1 is a block diagram of an example communications environment, including a plurality of electronic devices interacting through a network, supporting the suppression of extraneous alerts.
Figure 2:
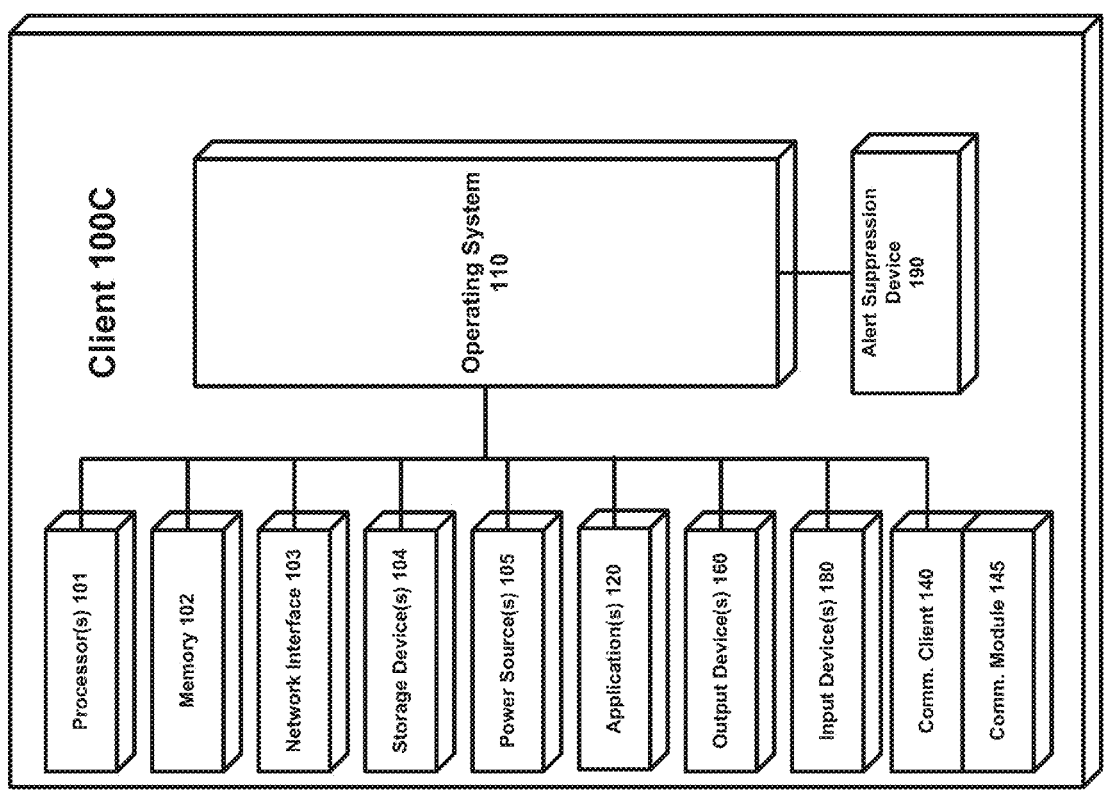
FIG. 2 is a block diagram of example functional components for one of the client devices in FIG. 1.

An example communications environment is described in FIGS. 1-2. The illustrated environment is presented as an example, and does not imply limitations or restrictions regarding the use of other communications environments. To the contrary, the description contemplates all implementations of communications environments that have the capability to manage alerts.

FIG. 1 is a block diagram of an example communications environment that supports the suppression of extraneous alerts. As shown, the system includes one or more server device(s) 300 in communication with one or more client devices 100A-100D. Examples of client devices 100A-100D include, but are not limited to, portable, mobile, and/or stationary devices such as landline telephones, mobile telephones (including "smartphones"), laptop computers, tablet computers, desktop computers, personal digital assistants (PDAs), portable gaming devices, portable media players, e-book readers, Internet-enabled televisions, or Internet-enabled appliances, among others. In some embodiments, two or more client devices 100A-100D are the same type of device. For example, client devices 100A and 100B may both be mobile telephones. In other embodiments, two or more client devices are different types of devices. For example, client devices 100A and 100B may both be mobile telephones and client device 100C may be a tablet computer.

In the embodiment illustrated by FIG. 1, the client devices 100A-100D communicate with a server device 300 via the communications channel 200. In one embodiment, the communications channel 200 includes an Internet connection between the client devices 100A-100D and the server device 300. In other embodiments, the connection may be over cellular phone network, a local area network (LAN), a wide area network (WAN), an Internet Service Provider (ISP) internal network, a wired network, a wireless network, or other type of network. In some embodiments, client devices 100A, 100B, and 100D include similar elements and functions as client device 100C. In other embodiments, client devices 100A, 100B, and 100D include different, fewer, or more elements and functions as client device 100C.

The user 10 of FIG. 1 can interact with each of the client devices 100A-100C to, for example, send and receive data through the communications channel 200. Similarly, the user 20 can direct the client device 100D to send and receive data through the communications channel 200. In some situations, the server 300 delivers data addressed to the user 10 to one or more of the clients 100A-100C. In other situations, the client device 100D transmits information to one or more of client devices 100A-100C via the communications channel 200 without server 300 assistance (e.g., peer-to-peer networking). Depending on the scenario, a client device may be considered a source or transmitting client, or a destination or receiving client, or both.

The server device 300 of FIG. 1 may comprise multiple physical servers for maintaining or hosting information delivered to the client devices 100A-100D. Each server can be a physically separate machine or can be different processes running within the same physical machine. The server device 300 can provide data to the one or more client devices 100A-100D.

In some cases, the server device 300 hosts a communications service—such as text messaging, telephony, video telephone, instant messaging, and the like—and routes communications among users of the service. In other cases, the server 300 hosts an information service providing advertisements, news, stock quotes, sporting scores, or any other information to users that subscribe to the service. In either case, the server device 300 can transmit data to a client device configured to receive information and/or messages from the service. Alternatively, a client device able to access the server device 300 can pull data from the server device 300 by querying the server 300 for information addressed to or designated for the client. In some embodiments, the server is configured to transmit a suppression command to one of the client devices 100A-100D to suppresses the alert at one or more particular client devices.

In the embodiment of FIG. 1, the server device 300 can maintain one or more user accounts for a user that subscribes to one or more services hosted by the server device 300. A user can establish an account and participate in a service provided by the server device 300. Additionally, a user can direct two or more client devices can concurrently access— or be "logged into"—the same account. Of course, each of the client devices 100A-100D may include one or more communications clients 140 and application(s) 120 supporting many services, accounts, and the like.

As an example, the server device 300 hosts an instant messaging service and the user 10, after establishing an account including a username (e.g., a unique identifier or address for user 10), directs one or more client devices 100A-100C to send and receive messages via an instant messaging client (e.g., communications client 140 of FIG. 2). In this case, the user 10 can direct an instant messaging client residing on each of the client devices 100A-100C to concurrently access the user's account to send and receive communications. That is, two or more client devices 100A-100C may be concurrently logged into (onto) the same account. As such, each client logged into the account may alert the user 10 of the arrival of an instant message addressed to the user's account. In another example, the server device 300 hosts an Email service. In this case, the user 20 establishes an Email address and interacts with the client device 100D to cause an Email client (e.g., communications client 140 of FIG. 2) to send and receive Email. As other examples, the server device 300 may host a mobile gaming platform, a telephone service, a video conferencing service, a website, and the like, and user accounts can be established, maintained, updated, and so on to suit the needs of the users.

The client device 100C of FIG. 1 includes application(s) 120, communications client 140, output device 160 (e.g., a display), and input device 180 (e.g., keyboard, mouse, touch screen). Application(s) 120 provide the client device 100C with a variety of functionalities. Examples include social media functionality, web browsing capabilities, calendars, contact information, games, and document processing. In some embodiments, application(s) 120 employ the output device 160 to display information at a graphical user interface (GUI) 165. In other embodiments, application(s) 120 employ the output device 160 to present information in other ways, such as by playing a sound or creating a vibration.

The communications client 140 further includes a communications module 145 that enables output device 160 to display information at the GUI 165. The communications module 145 also enables the communications client 140 to connect to the server device 300. Typically, the communications module 145 is a network module that connects the client device 100A to a network, such as the Internet or a cellular phone network, using one of a variety of available network protocol techniques. Examples of the communications client 140 include, but are not limited to, an Email client, an instant messaging (IM) client, a text messaging client, a telephony application, a gaming application, a social networking application, a network browser, and the like.

The GUI 165 is configured to display alerts received from the server device 300 through the communications channel 200. The alert informs the user that a new message or update has been received. The message or update can be consumed via one or more application(s) 120.

Referring now to FIG. 2, one particular example of client device 100C is illustrated. Many other embodiments of the client device 100C may be used as long as they support managing alerts as described herein. In the illustrated embodiment of FIG. 2, the client device 100C includes one or more processors 101, memory 102, a network interface 103, one or more storage devices 104, a power source 105, output device 160, and input device 180. The client device 100C also includes an operating system 110, applications 120, and a communications client 140 that are executable by the client. In this embodiment, the client device 100 includes an alert suppression device 190, which may comprise hardware, software, or any combination of hardware and software. In a conventional fashion, each of components 101, 102, 103, 104, 105, 120, 160, 180, 190, 110, and 140 are interconnected physically, communicatively, and/or operatively for inter-component communications.

As illustrated, processors 101 are configured to implement functionality and/or process instructions for execution within client device 100. For example, processors 101 execute instructions stored in memory 102 or instructions stored on storage devices 104. Memory 102, which may be a non-transient, computer-readable storage medium, is configured to store information within client device 100C during operation. In some embodiments, memory 102 includes a temporary memory, area for information not to be maintained when the client device 100C is turned OFF. Examples of such temporary memory include volatile memories such as random access memories (RAM), dynamic random access memories (DRAM), and static random access memories (SRAM). Memory 102 maintains program instructions for execution by the processors 101.

Storage devices 104 also include one or more non-transient computer-readable storage media. Storage devices 104 are generally configured to store larger amounts of information than memory 102. Storage devices 104 may further be configured for long-term storage of information. In some examples, storage devices 104 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The client device 100C of FIG. 2 includes network interface 103 to communicate with external devices via one or more networks, such as one or more wireless networks. Network interface 103 may be a network interface card, such as an Ethernet card, an optical transceiver, a radio frequency transceiver, infrared transceiver or any other type of device that can send and receive information. Other non-limiting examples of network interfaces include Bluetooth®, 3G, 4G, and WiFi® radios in mobile computing devices, LTE (Long Term Evolution) network interface, satellite, and USB (Universal Serial Bus). In some embodiments, the client device 100C uses network interface 103 to wirelessly communicate with an external device such as the server device 300 of FIG. 1, a mobile phone, or other networked computing device.

The client device 100C includes one or more input devices 180. Input device 180 is configured to receive input from a user through tactile, audio, and/or video feedback. Non-limiting examples of input device 180 include a presence-sensitive screen, a mouse, a keyboard, a voice responsive system, a video camera, a microphone, or any other type of device for detecting a command from a user. In some examples, a presence-sensitive screen includes a touch-sensitive screen.

One or more output devices 160 are also included in client device 100C. Output device 160 is configured to provide output to a user using tactile, audio, and/or video stimuli. Output device 160 may include a display screen (part of the presence-sensitive screen), a sound card, a video graphics adapter card, or any other type of device for converting a signal into an appropriate form understandable to humans or machines. Additional examples of output device 160 include a speaker, a cathode ray tube (CRT) monitor, a liquid crystal display (LCD), or any other type of device that can generate intelligible output to a user.

The client device 100C includes one or more power sources 105 to provide power to the client device. Non-limiting examples of power source 105 include single-use power sources, rechargeable power sources, and/or power sources developed from nickel-cadmium, lithium-ion, or other suitable material.

The client device 100C of FIG. 2 includes the alert suppression device 190. The alert suppression device 190 described herein provides for suppressing the output of alerts, including extraneous alerts. In some cases, an alert is considered extraneous when it is redundant. The alert suppression device 190 can view and analyze, with the consent of the user, information exchanged between the client device 100C and other devices through the channel 200. In some embodiments, information received by the client device 100C is analyzed by the alert suppression device 190 to determine whether it is appropriate to output an alert associated with the received data, or whether an alert would be a nuisance. Additional features and functionality of the alert suppression device 190 are described below.

The client device 100C includes an operating system 110, such as the Android® operating system. The operating system 110 controls operations of the components of the client device 100C. For example, the operating system 110 facilitates the interaction of communications client 140 with processors 101, memory 102, network interface 103, storage device(s) 104, input device 180, output device 160, and power source 105. As illustrated in FIG. 2, communications client 140 includes communications module 145. Each of communications client 140 and communications module 145 typically includes program instructions and/or data that are executable by the client device 100C. For example, in one embodiment, communications module 145 includes instructions causing the communications client 140 executing on the client device 100C to perform one or more of the operations and actions described in the present disclosure.

In some embodiments, communications client 140 and/or communications module 145 form a part of operating system 110 executing on the client device 100. In other embodiments, communications client 140 receives input from one or more of the input devices 180 of the client device 100C. Communications client 140 is configured to receive alerts associated with messages from a server device 300.

Figure 3:
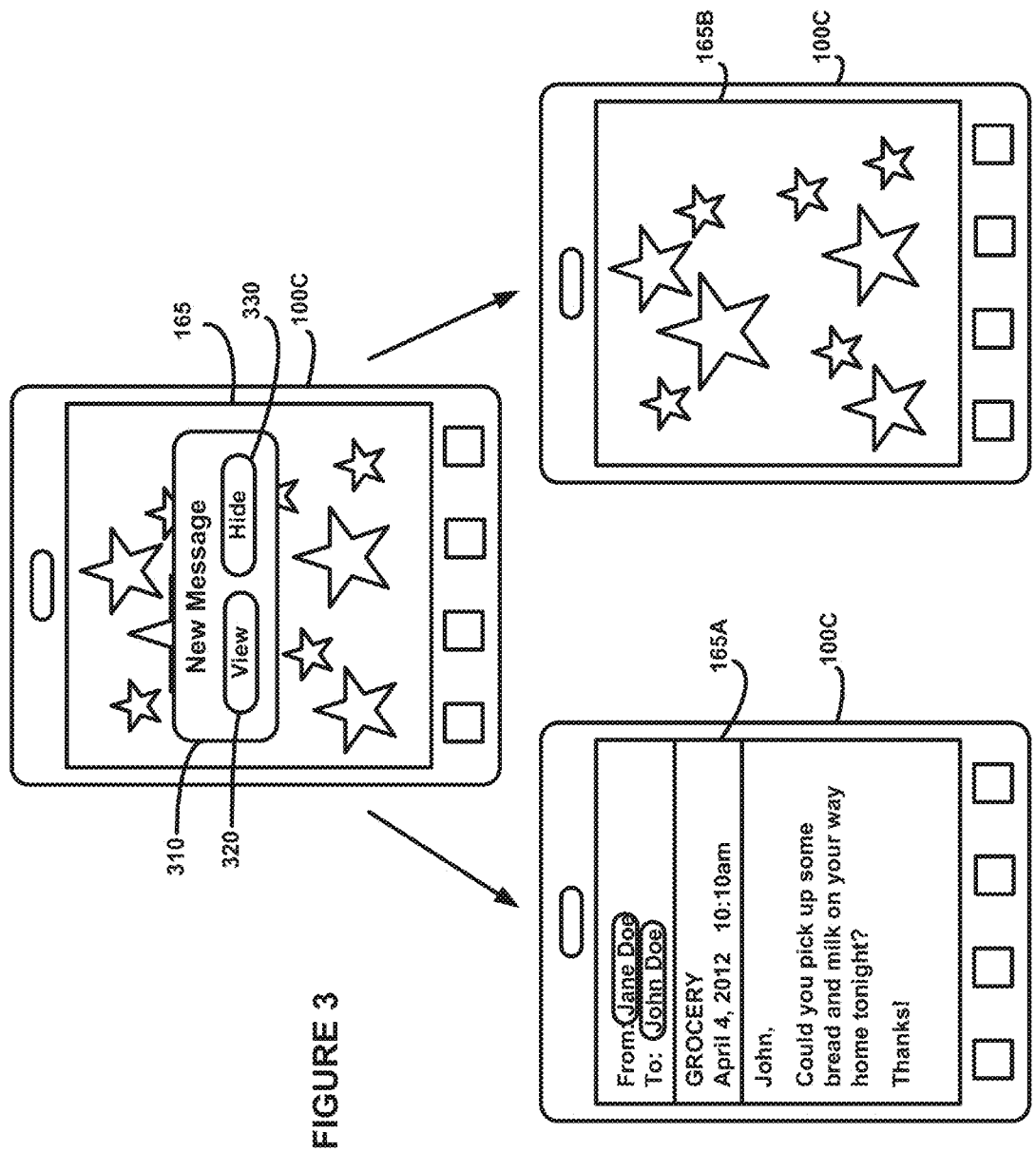
FIG. 3 is a conceptual diagram illustrating an example alert.

FIG. 3 is a conceptual diagram illustrating an example alert, according to one embodiment. As shown, alert 310 is displayed in the GUI 165 of client device 100C. The alert 310 is associated with a new message and includes options to view 320 the message or hide 330 the alert 310 and view the message later. If a user selects to the view 320 the message, the message can be viewed in an application that corresponds to the type of message received. An example GUI 165A showing an Email application where the user can view the message is shown in FIG. 3.

If the user selects to hide 330 the alert 310, the alert 310 is removed from the GUI 165. An example GUI 165B of a hidden or dismissed alert is also shown in FIG. 3. After the alert 310 is hidden, the GUI displays whatever was shown on the device 300 prior to receiving the alert 310. While the example of FIG. 3 illustrates visual alerts, the disclosure is not limited thereto. In some embodiments, the client device 100C supports visual, aural, or tactile output, or any combination thereof. For example, the arrival of the alert 310 can be accompanied by a sound and/or a vibration at the client 100C.

Figure 4:
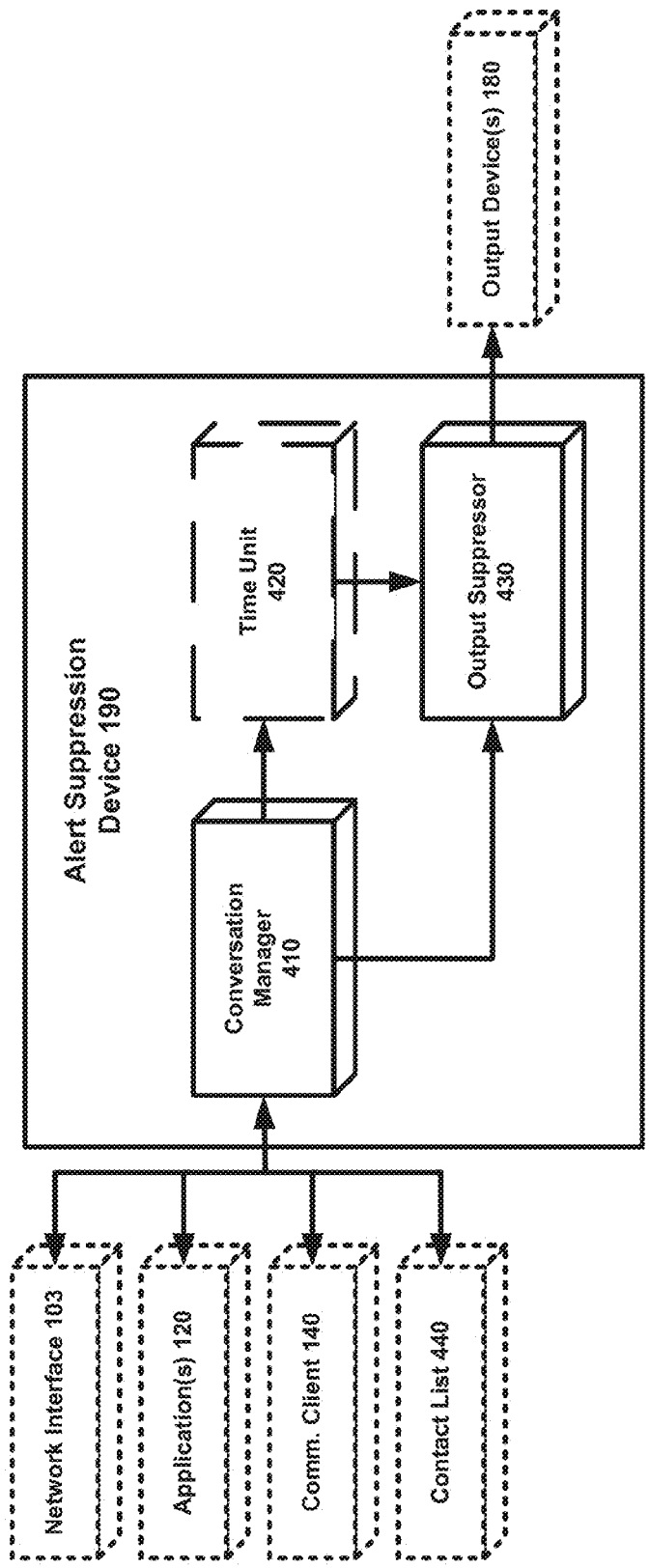
FIG. 4 is a block diagram of an example alert suppression device.

FIG. 4 is a block diagram illustrating an example alert suppression device 190 included in the client device 100C of FIG. 2. The illustrated device is presented as an example, and does not imply limitations or restrictions regarding the use of other alert suppression devices. To the contrary, the description contemplates all implementations alert suppression devices capable of managing alerts. In this example, the alert suppression device 190 includes a conversation manager 410, a time unit 420, and an alert suppressor 430. Elements 410-430 may comprise hardware, software, or any combination of hardware and software. In the illustrated embodiment, the elements 410-430 are contemplated as implemented by a processor consuming executable instructions.

The conversation manager 410 is coupled to the operating system 110 (FIG. 2) and may additionally be coupled to any hardware or software element of the client 100C that sends and receives data through the communications channel 200, such as the network interface 103, one or more applications 120 (e.g., a gaming application), the communications client 140 (e.g., an Email client), to name a few. When acceptable to the user, the conversation manager 410 views the information (via e.g., network ports, data streams, communications, etc.) that is exchanged between the client 100C and other devices through the communications channel 200. In some embodiments, information is pushed to the client 100C from another device through channel 200, such as the server device 300. In other embodiments, the client device 100C polls (pulls) another device for information accessible by the client 100C.

Information—such as a communication that is typically accompanied by the output of an alert—received by the client 100C can be analyzed by the conversation manager 410 to determine certain events associated with and/or features of the information. Features/events include, but are not limited to, the source (party that transmitted) and destination (recipient) of the information (e.g., contact information, an Email address, username, screen name, telephone number, internet protocol (IP) address, universal resource locator (URL), or any other address or identifier), the type of information (e.g., an advertisement, a text message, etc.), the time and/or date the information was received or transmitted, and so on.

Some embodiments of the alert suppression device 190 include a time unit 420, which receives input from the conversation manager 410 and outputs data to the output suppressor 430. In these embodiments, alerts can be suppressed for a set period of time, which may be configurable by a user or the client. In some cases, the set period of time indicates the amount of time since a conversation has ended. When included in the alert suppression device 190, the time unit 420 receives input regarding information exchanged by the client device 100C and another device through the channel 200, and sets a timer associated with the exchanged information.

In some situations, the time unit 420 sets a timer that begins running at the date and/or time that information is received by or transmitted from the client device 100C. In other situations, the time unit 420 sets a timer associated with the date and/or time that a user—identified by an unique identifier—engages or disengages in a communications session, conversation, or other form of message exchange. For example, the time unit 420 measures the amount of time that has elapsed since the most recent activity (transmission or reception of a message) in a given conversation. In this example, if the amount of time is equal to and/or exceeds a predetermined amount of time, suppressed alerts associated with the given conversation may be reactivated. The time unit 420 outputs the timing information (e.g., when a timer was initiated, the amount of time remaining on a timer, the amount of time that has elapsed since a certain event, etc.) to the output suppressor 430.

The output suppressor 430 receives input from the conversation manager 410, and in some embodiments from the time unit 420, and determines whether it is appropriate to suppress alerts. That is, the feature and/or event data extracted by the conversation manager 410 is analyzed, sometimes in combination with timing information from the time unit 420, by the output suppressor 430 to determine whether to output an alert suppression signal. In some embodiments, the output suppressor 430 determines whether the information exchanged by the client 100C is associated with a new or an existing conversation, whether a response has been—or should be—transmitted by the recipient of the information, the time and date a response is transmitted, a desired amount of time to suppress alerts, and so on. In the situation where alerts are to be suppressed, the output suppressor 430 sends a signal to the output device(s) 180, either directly or through another mechanism (such as the operating system 110), indicating an alert—associated with certain information or a specific conversation—is to be suppressed, whereby the output device 180 refrains from outputting the alert.

In a first example, the user 20 (FIG. 1) directs the client device 100D to generate and transmit a text message, initiating a new conversation, addressed to a user account (e.g., JohnDoe) associated with the user 10. The server device 300, hosting a text messaging service in this example, routes the message to one or more of the client devices 100A-100C that are enabled to receive the text message. Each client device 100A-100C that receives the message issues an alert to the user 10 of the new conversation. The user 10 directs the client device 100B, for example, to generate and transmit a response addressed to a user account associated with the user 20 (e.g., JaneDoe), thus engaging in the conversation. Thereafter, the conversation proceeds and messages are exchanged between the client devices 100B and 100D.

In this same example, the client device 100C may be considered "idle," because the user 10 is not actively engaged with the client 100C to participate in the conversation. As such, the alert suppression device 190 of the client 100C recognizes that its owner or current user—as identified by the user account JohnDoe—is participating in the conversation and suppresses alerts associated with the specific conversation. In further detail, the conversation manager 410 and the output suppressor 430 of client 100C views the conversation and determines whether the JohnDoe responded to the initial text message sent from the client 100D. When JohnDoe responded, the output suppressor 430 sends a suppression signal to the output device(s) 180 and subsequent alerts associated with the specific conversation are suppressed. Other idle client devices having alert suppression capabilities (such as the client device 100A) as well as the "active" client device 100B operate in the same manner as client 100C. As such, extraneous alerts associated with the text messaging conversation between JohnDoe and JaneDoe are suppressed.

In some cases, alerts may be continuously output, e.g., a blinking light, until the information associated with the alert is consumed. Using the techniques of this disclosure, idle clients as well as active clients (e.g., clients 100A-100C of this example) may discontinue the output of such an alert once the information is consumed.

Returning to the first example, consider the case where the text messaging conversation between JohnDoe and JaneDoe is active, and a third party sends a message—text or otherwise—to the user 10. As before, each client device 100A-100C that receives the message issues an alert to the user 10 indicating the new message from the third party. In this case, certain alerts, such as an audio alert, may be suppressed while others are output based on the user's 10 engagement with the client device 100B.

As mentioned, certain embodiments of the alert suppression device 190 support a time unit 420. Building on the first example, the alert suppression device 190 may be configured to suppress alerts associated with the text conversation for a set amount of time, e.g., 20 minutes. The time unit 420 can start a timer when each message is transmitted. An end of the text conversation may be indicated by the passage of the set amount of time. In this case, suppressed alerts are reactivated and if either party (user 10 or user 20) renews the text conversation an alert will be output. In some embodiments, the alert suppression device 190 may be configured to suppress all alerts for a predetermined amount of time after a given event, such as the reception of an important message or engaging an important party in conversation.

In some embodiments, the client device 100C maintains a contact list 440. The contact list may be managed by one or more of the application(s) 120, such as a contacts application. The contact list 440 includes identifying information—such as an address, telephone number, Email address, screen name, and so on—of individuals, businesses, and the like. For example, the contact list 440 stores the text account JohnDoe and the Email address john@doe identifying the user 10. Similarly, the contact list 440 can store the text account JaneDoe and the Email address jane@doe identifying user 20. In this way, a relationship between the personal identifiers of a particular contact can be established. In some embodiments, the alert suppression device 190 maintains or accesses the contact list 440 to determine whether certain parties are engaged in conversation. Thus, alerts can be suppressed when a user responds to a message through a different communication mechanism and/or from a different user account.

As a second example, the user 20 (FIG. 1) directs the client device 100D to generate and transmit a text message, initiating a new text message conversation, addressed to a user account (e.g., JohnDoe) associated with the user 10. The server device 300, hosting a text messaging service and an Email service in this example, routes the text message to one or more of the client devices 100A-100C that are enabled to receive the text message. Each client device 100A-100C that receives the text message issues an alert to the user 10 of the new text conversation. At this point, each alert suppression device 190 of the client devices 100A-100C is aware that the user 10 has not engaged in the text message conversation, thus alerts are not suppressed.

In this example, the user 10 directs an Email client (or any other communication mechanism) residing on the client device 100B to generate and transmit an Email addressed to an Email account associated with the user 20 (e.g., jane@doe). The alert suppression device 190 of client 100C (which is regularly viewing information pushed or pulled from the server device 300) refers to the contact list 440, recognizes that a message associated with user 10 was transmitted to user 20, and suppresses subsequent alerts in the text message conversation, and/or the Email conversation, and/or any other conversation between user 10 and user 20.

Figure 5:
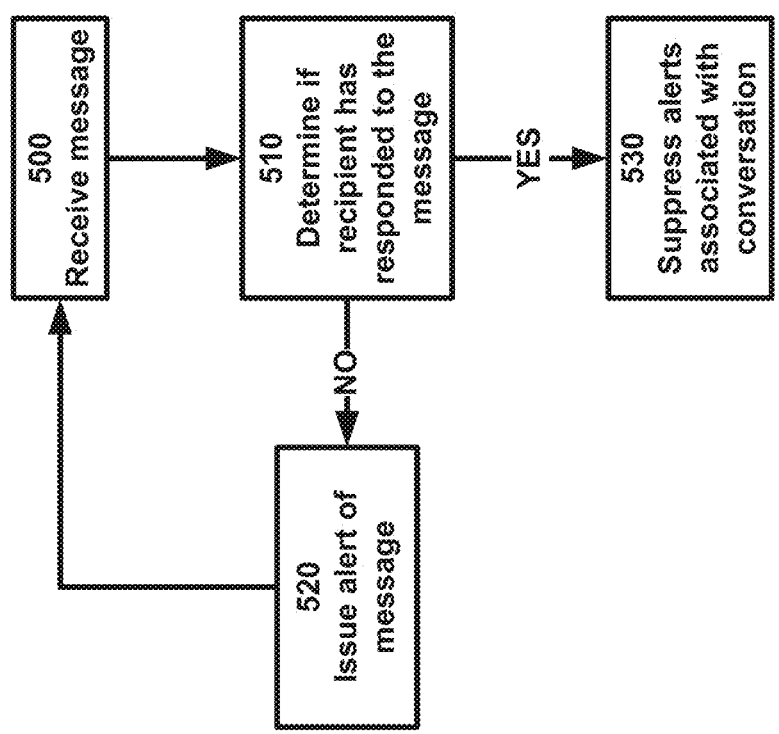
FIG. 5 is a flow diagram illustrating an example method for suppressing one or more alerts associated with a received message.
Figure 6:
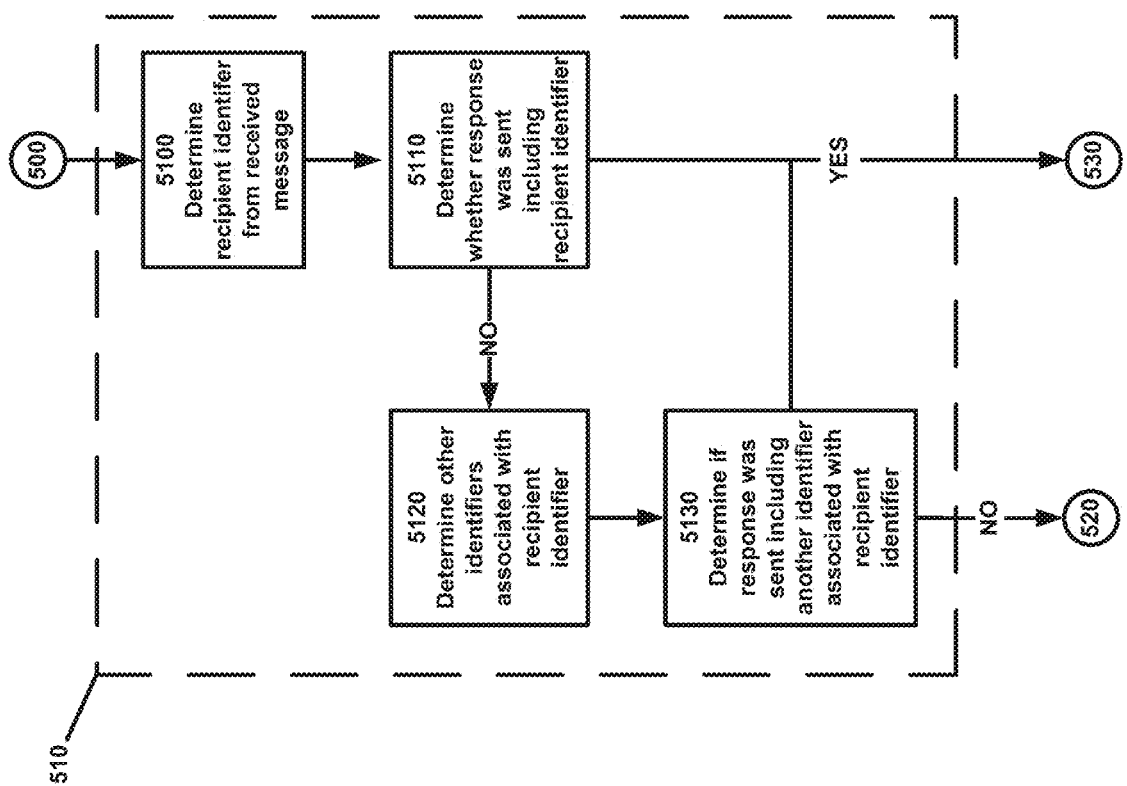
FIG. 6 is a flow diagram illustrating an example method for determining if the recipient of a message has responded to the message.
Figure 7:
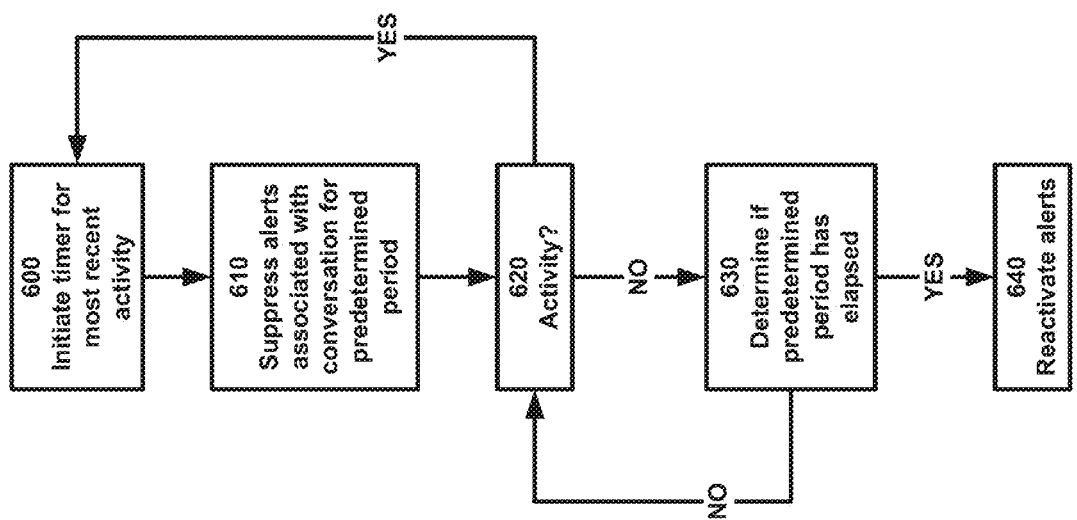
FIG. 7 is a flow diagram illustrating an example method for suppressing one or more alerts associated with a received message.

FIGS. 5-7 describe example processes supporting the suppression of extraneous alerts. As such, the process illustrated in FIGS. 5-7 can be used in combination with the features, elements, and techniques described above. Turning to FIG. 5, an example process for suppressing one or more alerts associated with a received message is described.

500: Receive Message.

A message, or any other type of data, is received at stage 500. As described, the data may be a text message, an Email, a telephone call, a news update, a sports score, an indication that an opponent has participated in an online game, a photo message, an audio message, or any other data that can be transmitted through a communications network.

510: Determine if Recipient has Responded to the Message.

After a message is received at stage 500, the process advances to stage 510 where it is determined whether the intended recipient of the message has responded to the message. Techniques for determining whether the recipient has responded are further discussed with respect to FIG. 6.

520: Issue Alert of Message.

When it is determined at stage 510 that the recipient has not responded to the message, an alert is issued to indicate reception of the message. Alerts can be visual and/or aural and/or tactile. Alerts can be discrete or continuous.

530: Suppress Alert Associated with Conversation.

When it is determined at stage 510 that the recipient has responded to the message, subsequent alerts associated with the conversation and/or continuous alerts initiated by the message received at stage 500 are suppressed. In some embodiments, all alert mechanisms are suppressed, e.g., visual, aural, and tactile. In other embodiments, only certain alert mechanisms are suppressed.

FIG. 6 is an example method for determining if a recipient has responded to a message, such as stage 510 of FIG. 5.

5100: Determine Recipient Identifier from Received Message.

In stage 5100, the intended recipient of a message is identified. Recipient information may include contact information, an Email address, username, screen name, telephone number, internet protocol (IP) address, universal resource locator (URL), or any other address or identifier. In some embodiments, a message includes both content data and envelope data (e.g., header data, metadata, and the like) describing properties of the message. In these embodiments, recipient information may be included in the envelope data and is extracted in stage 5100. For purposes of example, a telephone number is the recipient information in stage 5100.

5110: Determine Whether Response was Sent Including the Recipient Identifier.

In stage 5110 the exchange of data, e.g., between a destination client device and another networked device, is analyzed to determine if a response—to the message received in stage 500 of FIG. 5—including the recipient identifier (e.g., telephone number) has been transmitted, indicating that the recipient has engaged in the conversation. When a response is transmitted including the recipient identifier, the process proceeds to stage 530 of FIG. 5.

5120: Determine Other Identifiers Associated with Recipient Identifier.

If a response was not transmitted including the recipient identifier in stage 5110, the process advances to stage 5120 where other identifiers (e.g., Email address, instant messaging name, etc.) associated with the recipient identifier are determined. As described above, other identifiers can be determined by accessing and analyzing a contact list, address book, or other organized source of contact information.

5130: Determine if Response was Sent Including Another Identifier Associated with Recipient Identifier.

From stage 5120, the process advances to stage 5130 where the exchange of data, e.g., between a destination client device and another networked device, is analyzed to determine one of the identifiers determined in stage 5120 is included in a response to the message received in stage 500 of FIG. 5, indicating that the recipient has engaged in the conversation. When a response is transmitted including an identifier associated with the recipient identifier, the process proceeds to stage 530 of FIG. 5. Otherwise, the process proceeds to stage 520 of FIG. 5.

FIG. 7 illustrates an example method for suppressing one or more alerts associated with a received message.

600: Initiate Timer for Most Recent Activity.

In stage 600 a timer is started (or reset) for each interaction in a given conversation. Thus, the timer is initiated for the most recent activity or interaction in the conversation.

610: Suppress Alerts Associated with Conversation for Predetermined Period.

In stage 610 alerts associated with the given conversation are suppressed for a predetermined period of time, thus messages exchanged in the conversation do not trigger an alerts during this time period. The time period may be configured, set, updated and the like to meet the needs and expectations of a user. Alternatively, a time period can be established by a client device itself or by a manufacturer at the time of fabricating the client device.

620: Activity?

Stage 620 considers whether the conversation has progressed, i.e., whether additional communications have been sent or received. It the case where the conversation has progressed, the process returns to stage 600.

630: Determine if Predetermined Period has Elapsed.

In the case where the conversation has not progressed in stage 620, the process advances to stage 630 where it is determined whether the amount of time since an interaction is equal to or exceeds the predetermined period. Stage 630 can be achieved by comparing the amount of time elapsed on the timer of stage 600 to the predetermined period. When it has not, the process returns to stage 620.

640: Reactivate Alerts.

When the amount of time since an interaction equal or exceeds the predetermined period, which may indicate that the conversation has ended, alerts associated with the given conversation (e.g., between the parties) are reactivated.

Figure 8:
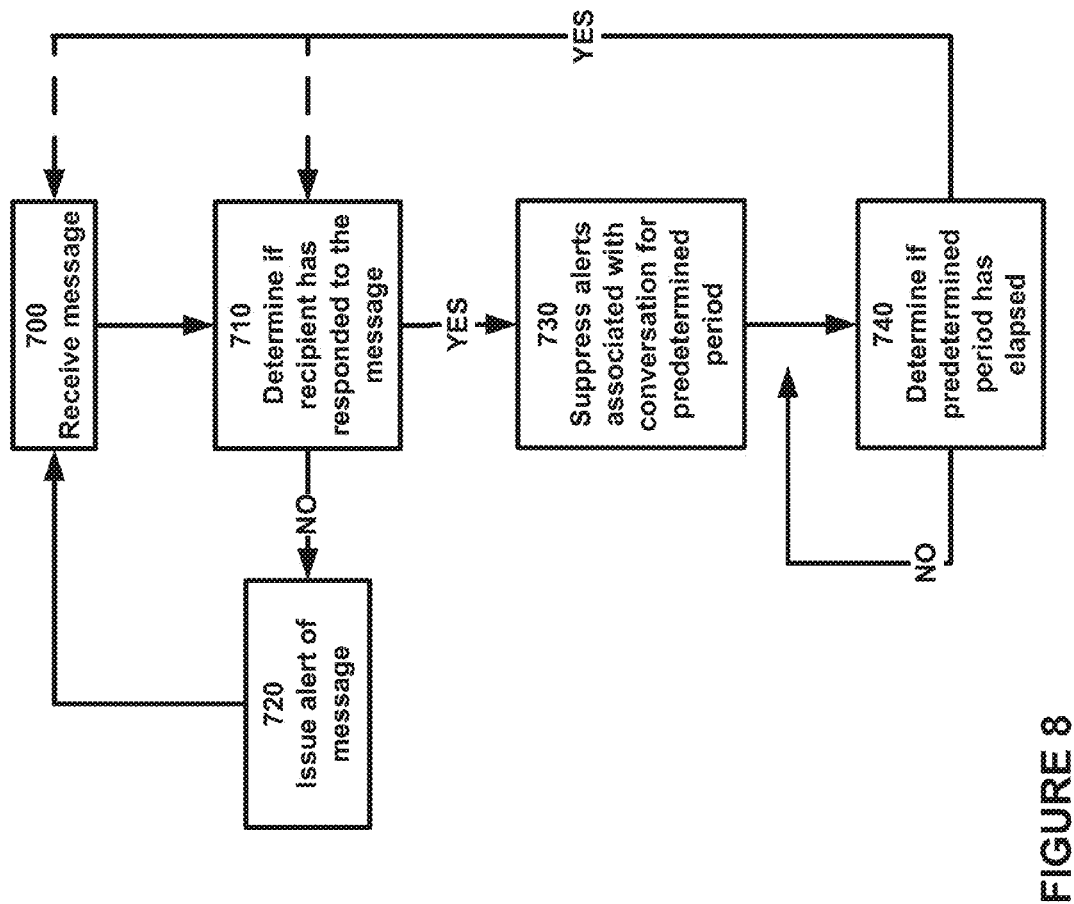
FIG. 8 is a flow diagram illustrating an example method for suppressing one or more alerts associated with a received message.

FIG. 8 is a flow diagram illustrating an example method for suppressing one or more alerts associated with a received message including steps 700, 710, 720, 730, 740.

Each example processes of FIG. 5-7 can be implemented on one or more of the client devices 100A-D described above. Additionally, the process of FIG. 5-7 can execute on an idle client device as well as an active client device to suppress alerts.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system comprising:
a network:
a first destination client device associated with a user and connected to the network;
a second destination client device associated with the user and connected to the network; and
a server device that transmits, to the first destination client device and the second destination client device, a first electronic communication having a destination associated with the user, wherein the first electronic communication is one of a text message, an instant message, an email, a telephone call, a photo message, an audio message, and a video-enabled telephone call, and wherein the destination is one of an email address, a telephone number, a screen name, a username, an Internet protocol address, or a uniform resource locator
wherein the first destination client device, in response to receiving the first electronic communication, outputs an alert associated with the first electronic communication and sends, to the server, a response communication,
wherein the second destination client device, in response to receiving the first electronic communication, outputs a second alert associated with the first electronic communication,
wherein the server device, in response to receiving the response communication, transmits, to the first destination client device and the second destination client device, a second electronic communication,
wherein the first destination client device, in response to receiving the second electronic communication, outputs a first alert associated with the second electronic communication, and
wherein the second destination client device, in response to receiving the second electronic communication: determines, based on the second electronic communication, whether the user used the first destination client device to respond to the first electronic communication and, in response to determining that the user used the first destination client device to respond to the first electronic communication, suppresses output of a second alert associated with the second electronic communication.

2. The system of claim 1, wherein the second destination client device comprises:
   a conversation manager that determines whether the user used the first destination client device to respond to the first electronic communication; and
   an output suppressor that suppresses output of the second alert associated with the second electronic communication.

3. The system of claim 2, wherein the conversation manager extracts information from the second electronic communication and reports the extracted information to the output suppressor.

4. The system of claim 2, wherein the second destination client device further comprises a time unit, coupled to the conversation manager and the output suppressor, that outputs timing information to the output suppressor.

5. The system of claim 4, wherein the output suppressor analyzes information extracted by the conversation manager and the timing information output by the time unit to determine whether to output the alert suppression signal.

6. The system of claim 1, further comprising a source client connected to the network, wherein the source client generates the second electronic communication.

7. The system of claim 1, wherein the server device hosts an information service, generates the second electronic communication, transmits the second electronic communication to the second destination client device destination, and transmits a suppression command to the second destination client device to suppress the second alert associated with the second electronic communication.

8. A method comprising:
   transmitting, by a computing device and to a first destination client device and to a second destination client device different from the first destination client device, a first electronic communication, wherein the first destination client device and the second destination client device are associated with a user;
   responsive to receiving, by the first destination client device, the first electronic communication:
      outputting, by the first destination client device, a first alert associated with the first electronic communication; and
      sending, by the first destination client device, a response communication;
   responsive to receiving, by the second destination client device, the first electronic communication, outputting, by the second destination client device, a second alert associated with the first electronic communication;
   responsive to receiving, by the computing device, the response communication, transmitting, from the computing device and to the first destination client device and the second destination client device, a second electronic communication;
   responsive to receiving, by the first destination client device, the second electronic communication, outputting, by the first destination client device, a first alert associated with the second electronic communication; and
   responsive to receiving, by the second destination client device, the second electronic communication:
      determining, by the second destination client device and based on the second electronic communication, whether the user associated with the first and second destination client devices used the first destination client device to respond to the first electronic communication; and
      responsive to determining that the user used the first destination client device to respond to the first electronic communication, suppressing, by the second destination client device, output of a second alert associated with the second electronic communication.

9. The method of claim 8, further comprising:
extracting, by the second destination client device, information from the second electronic communication,
wherein suppressing output of the second alert associated with the second electronic communication is based at least in part on the information extracted form the second electronic communication.

10. The method of claim 8, further comprising:
receiving, by the second destination client device, a third electronic communication;
determining, by the second destination client device, an amount of time that has elapsed between receiving the second electronic communication and the third electronic communication;
determining, by the second destination client device and based on the amount of time, whether to suppress an alert associated with the third electronic communication.

11. The method of claim 1, further comprising:
transmitting, by the server and to the second destination client device, a suppression command to suppress the second alert associated with the second electronic communication,
wherein suppressing the second alert is further in response to receiving the suppression command.

* * * * *